United States Patent [19]

Weiler et al.

[11] Patent Number: 5,494,140
[45] Date of Patent: Feb. 27, 1996

[54] BRAKE SHOE WITH RETAINING SPRING

[75] Inventors: Rolf Weiler, Eppstein; Dieter Bieräugel, Hochheim; Uwe Bach, Niederhausen-Oberjosbach, all of Germany

[73] Assignee: Alfred Teves GmbH, Germany

[21] Appl. No.: 378,909

[22] Filed: Jan. 26, 1995

Related U.S. Application Data

[63] Continuation of Ser. No. 117,002, filed as PCT/EP92/00071, Jan. 15, 1992, abandoned.

[30] Foreign Application Priority Data

Apr. 20, 1991 [DE] Germany .......................... 41 12 947.4

[51] Int. Cl.[6] ................................................. F16D 65/40
[52] U.S. Cl. ................. 188/73.38; 188/258; 188/250 G; 188/250 B; 188/73.37
[58] Field of Search .................... 188/72.4, 73.35–73.38, 188/234, 258, 250 G, 251 A, 250 B; 24/295, 682, 687–689, 691

[56] References Cited

U.S. PATENT DOCUMENTS

| | | | |
|---|---|---|---|
| 3,387,687 | 6/1968 | Eggstein | 188/73.31 |
| 4,075,142 | 2/1978 | Morse | 260/17 R |
| 4,335,806 | 6/1982 | Lupertz | 188/73.38 |
| 4,513,844 | 4/1985 | Hoffman | 188/71.6 |
| 4,611,693 | 9/1986 | Wang | 188/73.34 |
| 4,836,339 | 6/1989 | Kobayashi | 188/73.1 |
| 4,970,766 | 11/1990 | Hsiau | 24/40 R |

FOREIGN PATENT DOCUMENTS

| | | |
|---|---|---|
| 0056918 | 8/1982 | European Pat. Off. . |
| 0341610 | 5/1989 | European Pat. Off. . |
| 0373333 | 6/1990 | European Pat. Off. . |
| 2299559 | 8/1976 | France . |
| 9000489 | 5/1990 | Germany . |

*Primary Examiner*—Robert J. Oberleitner
*Assistant Examiner*—Clifford T. Bartz
*Attorney, Agent, or Firm*—Dykema Gossett

[57] ABSTRACT

A brake shoe for spot-type disc brakes. The novel brake shoe incorporates a retaining spring which is fixed to the brake shoe's backplate and which is intended to engage a hollow portion of a brake piston. Preferably the backplate is coated with a silencing varnish paint for noise abatement. A fixing section of the retaining spring is formed with a step which is in abutment against the backplate in a range devoid of silencing varnish paint. The retaining spring is secured to safeguard against twisting. The operability of the retaining spring is preserved, independently of the accidental thickness of the layer of silencing varnish paint.

3 Claims, 2 Drawing Sheets

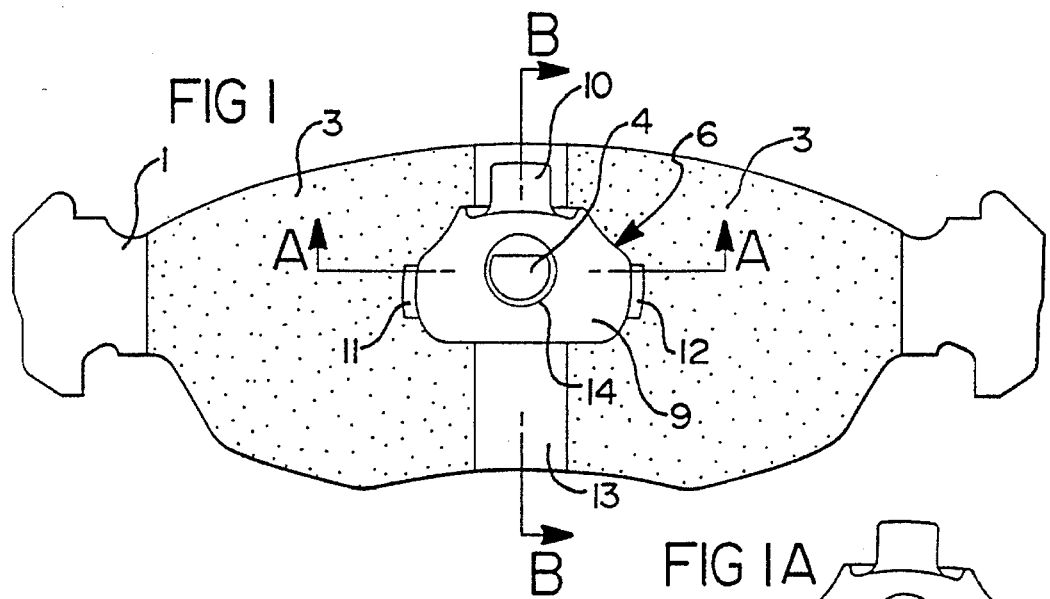
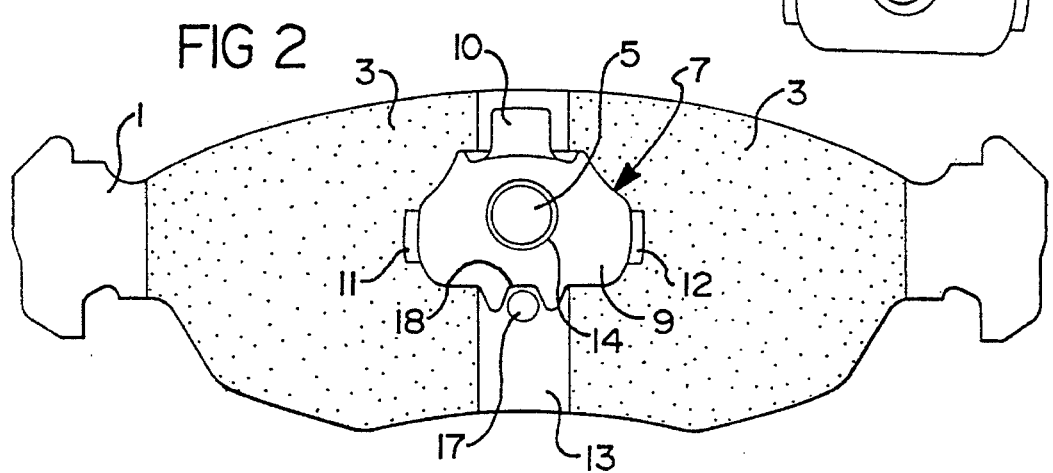
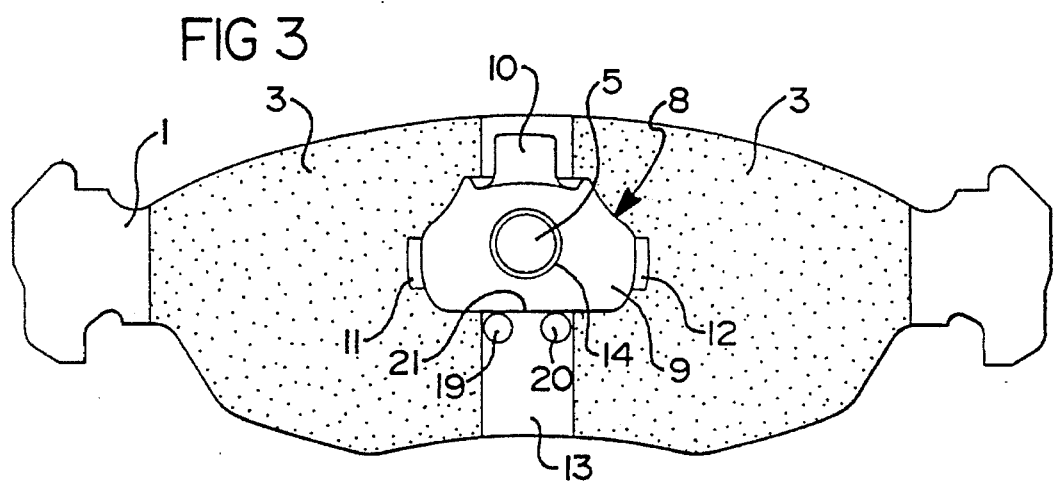

BRAKE SHOE WITH RETAINING SPRING

This is a continuation of application Ser. No. 08/117,002, filed as PCT/EP92/00071, on Jan. 15, 1992, now abandoned.

TECHNICAL FIELD

The invention relates to brake shoes and more specifically to brake shoes using with retaining springs for a spot-type disc brake.

BACKGROUND OF THE INVENTION

In a spot-type disc brake one brake shoe is actuated directly by the piston of a hydraulic actuating apparatus. In this configuration, the piston is in abutment against the backplate of the brake shoe and urges the brake shoe axially against the brake disc during the braking operation. It is state of the art to rivet a retaining spring to the backplate of the brake shoe. The retaining spring is typically shaped as a spring plate having spring arms that engage the hollow piston and abut against its inside wall. By means of the spring, the brake shoe is captivated to the piston so that upon braking it is entrained by the piston when the latter is being retracted and a clearance is thereby created between the brake shoe and the brake disc.

Prior-art retaining springs are comprised of a plane, central fixing section which is in abutment against the backplate of the brake shoe and which is formed with an opening for the passage of a rivet. Laterally said fixing section passes over to three spring arms which are bent off substantially at right angle relative to the plane of the fixing section and which jut out from the backplate in order to extend into the hollow brake piston. In this context, two spring arms are disposed opposite each other with respect to the axis of the piston and the third one at right angle to it.

It is, moreover, prior art to furnish the backplate with a buttonhead through tab so that a projection standing out from the plane of the backplate is formed to which the retaining spring is fixed.

Furthermore, it is state of the art to coat the backplates with a silencing varnish paint in order to prevent braking noise. The silencing varnish paint is customarily applied by means of a roller being passed over the backplate. However, no projections must then jut out from the plane of the backplate which could damage said roller.

It is an object of the invention to create a brake shoe in which a retaining spring is fixed to a projecting buttonhead through tab of the backplate and in which the backplate is coated with silencing varnish paint.

The arrangement of the present invention bears the advantage that the silencing varnish paint can be applied in the proven manner by means of a roller. Said roller requires only a slight modification by dividing it into two sections or part-rollers in order to avoid the projecting buttonhead through tabs. In this way a band-shaped range of the backplate will result which is free of silencing varnish paint and in which the buttonhead through tabs are positioned.

In order not to impair the effect of the silencing varnish paint, the band-shaped range must be as narrow as possible. Because of its width, a plane fixing section of the retaining spring would abut against the backplate both in the band-shaped range and in the range coated with silencing varnish paint and become more or less deformed during the riveting depending on the thickness of the layer of silencing varnish paint. An undefined deformation of the fixing section leads, however, to an unpredictable position of the spring arms, so that their full operativity can no longer be relied on.

Because of the presence of the plateau-shaped step, the installation of the fixing section on the backplate is limited to the section of the backplate which is free of silencing varnish paint, whereby any deformation is avoided and the operability of the spring arms, in particular a constant force of pressing against the brake piston, is, advantageously, preserved.

On account of the inventive reduced abutment surface of the fixing section, a retaining spring which is fastened in the customary manner by one single buttonhead through tab having a circular cross section will be safeguard against twisting.

BRIEF DESCRIPTION OF THE DRAWINGS

FIG. 1 is a top view of an inventive brake shoe of the present invention with a retaining spring in a first embodiment.

FIG. 1A is a top view of the retaining spring of FIG. 1 showing the "D"-shaped opening there through.

FIG. 2 shows a second embodiment of the retaining spring.

FIG. 3 shows a third embodiment of the retaining spring.

Figure 4:
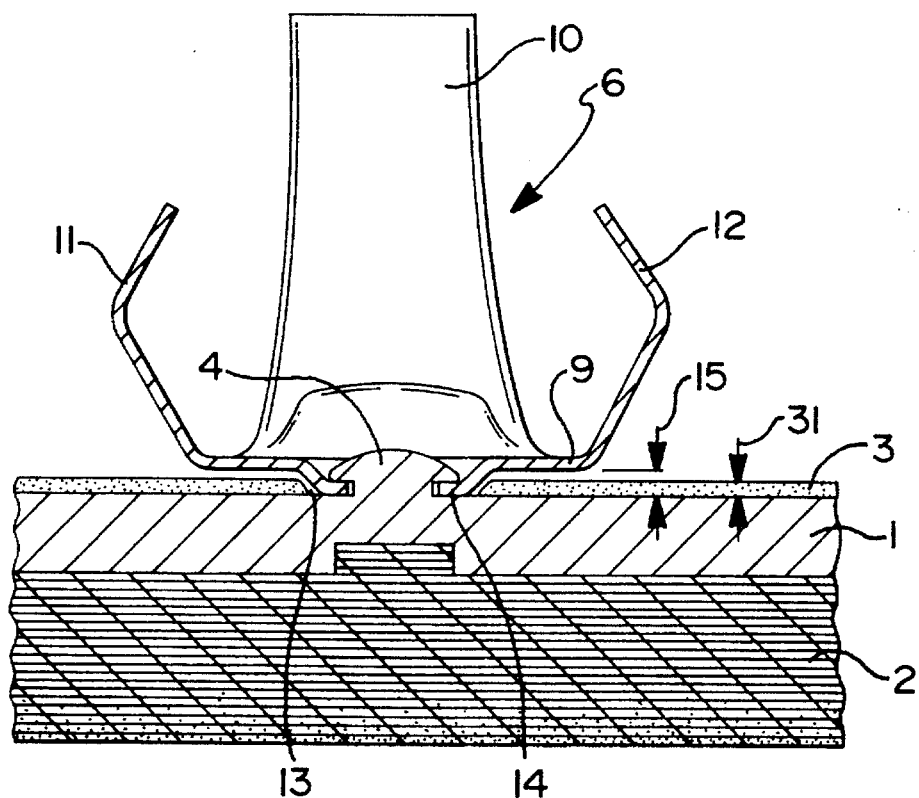
FIG. 4 shows a partial cross-sectional view of the retaining spring taken substantially along lines A—A of FIG. 1.
Figure 5:
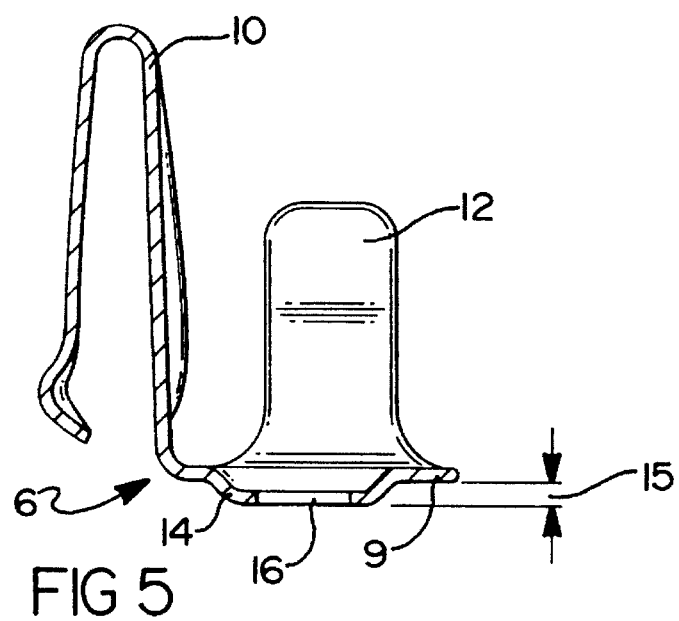
FIG. 5 shows a partial cross-sectional view of the retaining spring sectioned along the line B—B of FIG. 1.

The illustrated brake shoes are all furnished with a backplate 1 whose front side is provided with a friction lining 2 and whose rear is furnished with a silencing varnish paint 3. The backplate 1 is formed in its center with a buttonhead through tab 4, 5 jutting out of the former's plane, by means of which a retaining spring 6, 7, 8 is fixed. The retaining springs 6, 7, 8 are stamped from spring plate and are each provided with a fixing section 9 which is in abutment against the backplate 1 and is formed with an opening 16 being intended for the passage of the buttonhead through tab 4, 5, and with three spring arms 10, 11, 12 which start from said fixing section 9 and which are intended to engage a hollow piston not being shown in the drawings.

According to the invention, the buttonhead through tabs 4, 5 are positioned in a band-shaped range 13 of the backplate 1 which is free of silencing varnish paint 3, and the fixing section 9 is furnished with a circularly defined step 14 which stands up from the plane of the fixing section 9 in the direction of the backplate 1. The height 15 of the step 14 corresponds approximately to the thickness 31 of the layer of silencing varnish paint 3. Exclusively with their steps 14 the retaining springs 6, 7, 8 are abutted against the backplate 1 in the band-shaped range 13.

In the first embodiment shown in FIG. 1 the buttonhead through tab 4 is configured with a D-shaped profile section as a safeguard against twisting of the retaining spring 6, and the associated opening 16 in the fixing section 9 is adapted correspondingly (see FIG. 1A showing "D"-shaped profile of opening 16).

In the second embodiment which is illustrated in FIG. 2 the backplate 1 is furnished in its range 13 with two projecting circular buttonhead through tabs 5, 17. At the buttonhead through tab 5 the retaining spring 7 is riveted. The fixing section 9 is furnished at its laterally projecting range with a recess 18 which laterally surrounds the buttonhead through tab 17 in order to safeguard the retaining spring 7 against twisting about its fixing point.

In the third embodiment shown in FIG. 3 three circular buttonhead through tabs 5, 19, 20 are provided. In this instance, the fixing section 9 has a straight lateral edge 21 to which the two buttonhead through tabs 19, 20 are juxtaposed which are positioned at a distance from each other and against which they may be abutted as a safeguard against twisting of the retaining spring 8.

We claim:

1. A brake shoe for a spot-type disc brake, comprising:

a backplate having at least one buttonhead tab and a friction lining, said backplate partially coated and partially uncoated with a silencing varnish paint;

a retaining spring fixed to said at least one buttonhead tab of said backplate, said retaining spring including a fixing section, a spring arm section, and a plateau-shaped step extending between said fixing section and said spring arm section, said fixing section abutted against said partially uncoated portion of said backplate, said fixing section including at least one opening for passing the buttonhead tab therethrough, wherein said buttonhead tab is positioned in said uncoated portion of said backplate and wherein said plateau-shaped step includes a height which is at least as great as the thickness of said silencing varnish paint which projects from the coated portion of the backplate.

2. A brake shoe for a disc brake, comprising:

a backing plate having a back surface and at least one tab extending from said back surface;

silencing varnish residing on a portion of said back surface thereby defining a coated region and a portion of said back surface devoid of silencing varnish defining an uncoated region;

a retaining spring fixed by said tab to said backing plate, said spring including a fixing section, a spring arm section, and a step section extending between said fixing section and said spring arm section;

said step section having a height which corresponds approximately to the thickness of the silencing varnish.

3. The brake shoe of claim 2, wherein said fixing section of said retaining spring contacts said uncoated region of said back surface.

* * * * *